July 12, 1938.   J. BASILE   2,123,326
BED STRUCTURE
Filed Dec. 14, 1932   4 Sheets-Sheet 3
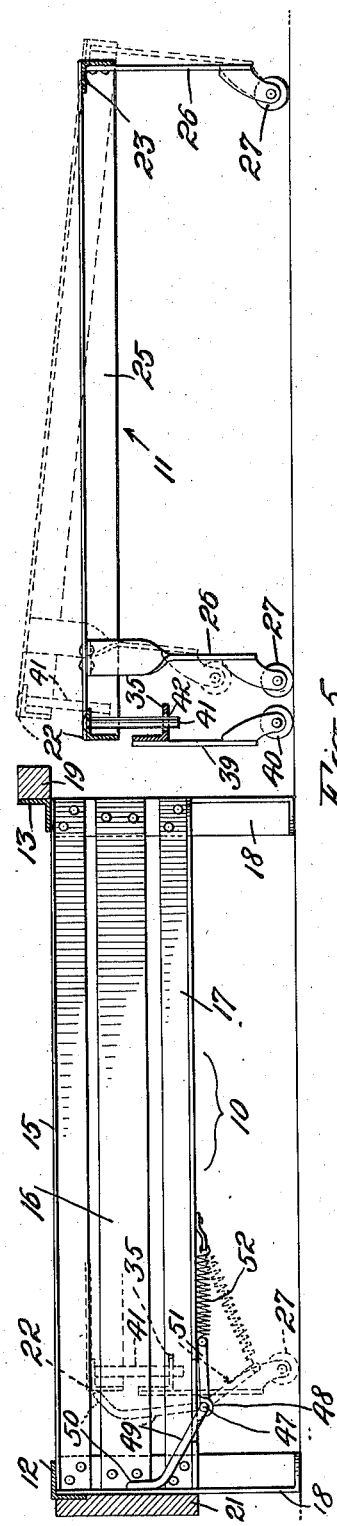
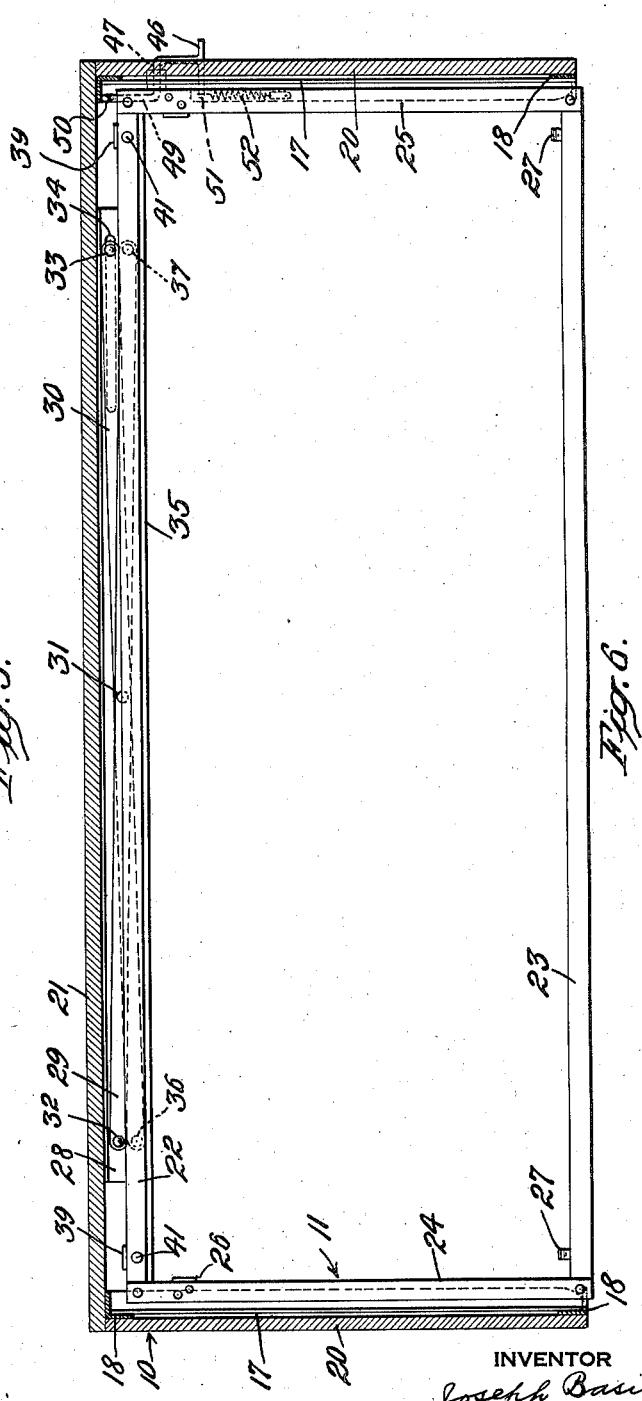
INVENTOR
Joseph Basile
BY Geo. L. Wheelock
ATTORNEY July 12, 1938.  J. BASILE  2,123,326
BED STRUCTURE
Filed Dec. 14, 1932  4 Sheets-Sheet 4
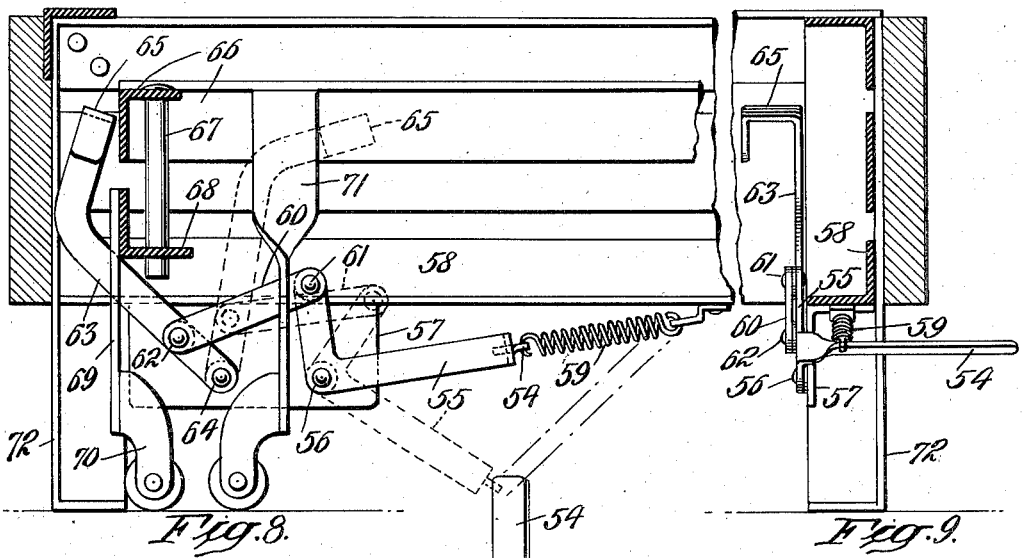
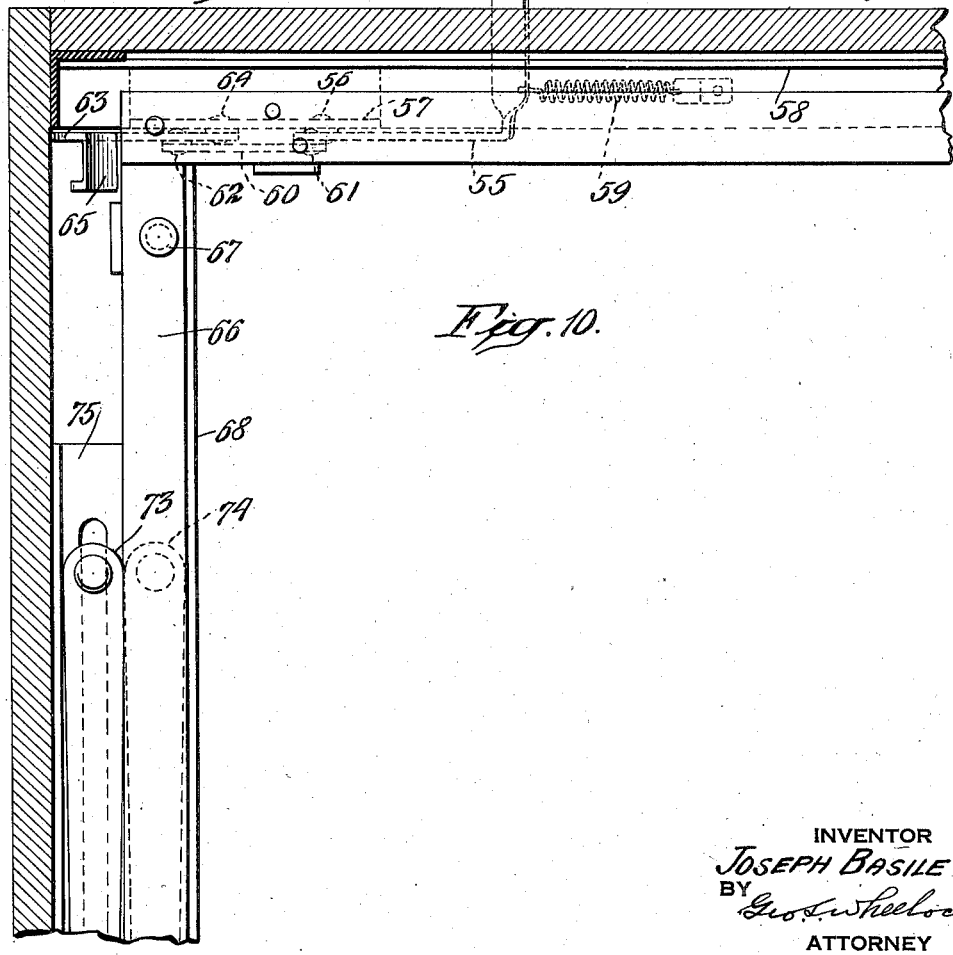
INVENTOR
JOSEPH BASILE
BY
ATTORNEY Patented July 12, 1938

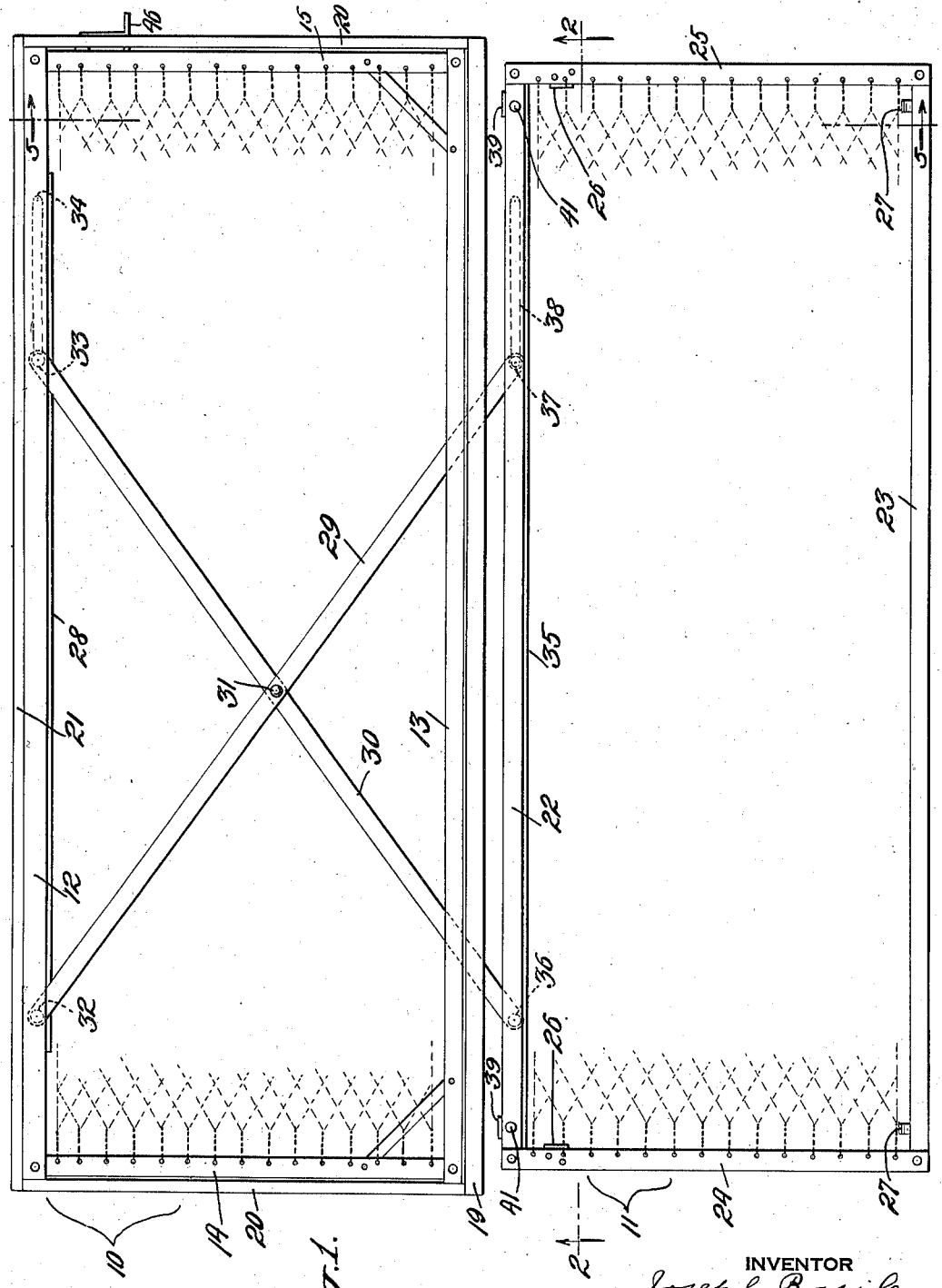

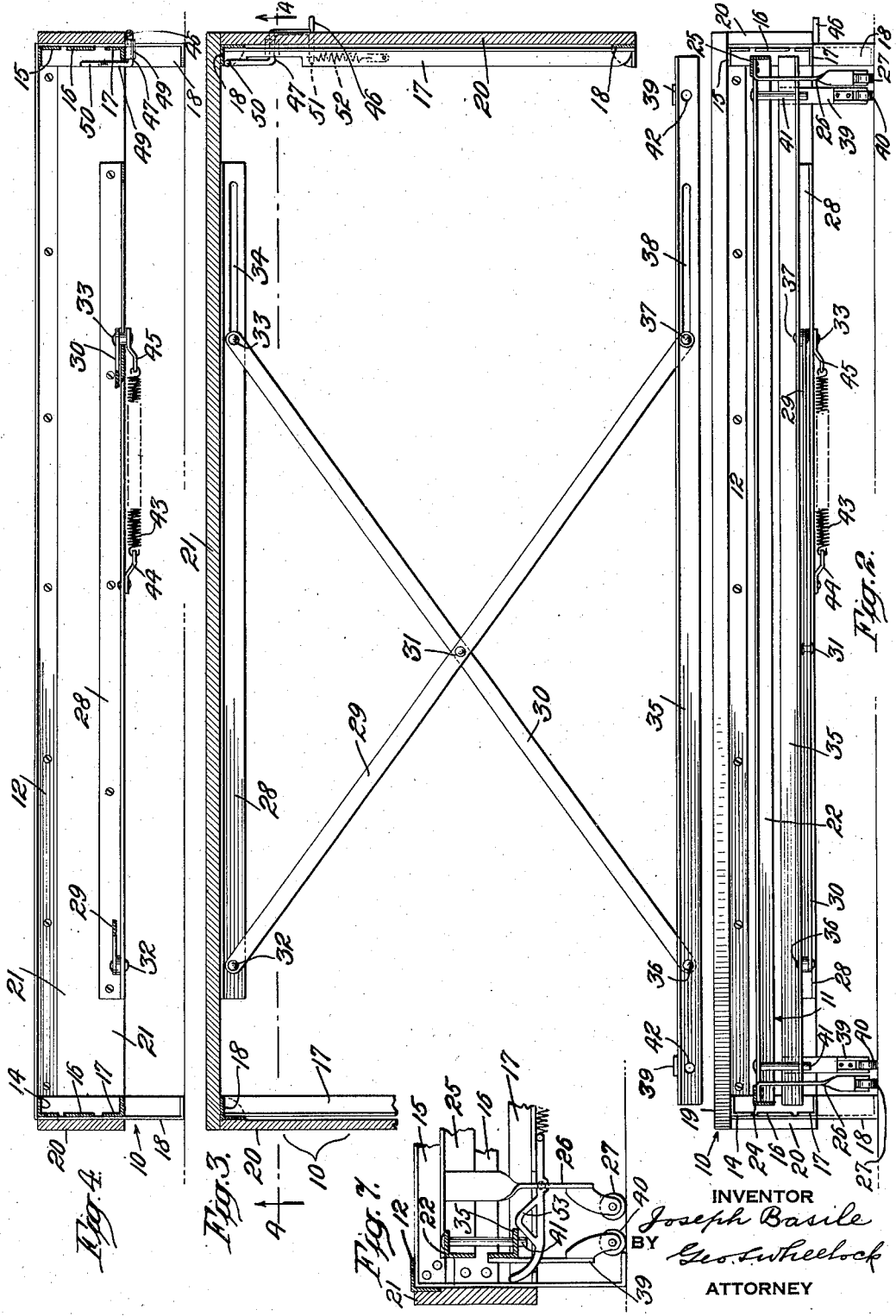

2,123,326

UNITED STATES PATENT OFFICE 2,123,326

BED STRUCTURE

Joseph Basile, New York, N. Y., assignor to Greenpoint Metallic Bed Co., Inc., Brooklyn, N. Y., a corporation of New York Application December 14, 1932, Serial No. 647,086

13 Claims. (Cl. 5—18)

This invention relates to beds or bed structures of the type which is convertible into a double bed or into a single bed and may be finished so as to be used as a sofa or couch, and in which type of bed two telescoping bed frames or sections are provided, one of which may remain in situ while the other may go alongside of the stationary bed section to provide a double bed.

An object of the present invention is to provide a bed structure of the type referred to and which is preferably so designed and constructed that the slidable bed section may be worked either manually or automatically so as to place it in double bed position in relation to the bed section which remains stationary.

In carrying out such preferred object of the invention a carrier or coupling member is employed which may be supported from one of the bed sections or frames and which carrier member may be subjected to spring pressure so that when desired the other bed section or frame may be moved out automatically at will; or if such spring pressure is not employed, the movable section or frame may be guided rectilinearly with respect to the section or frame which remains stationary, and such rectilinear guiding movement is preferably resorted to whether or not the movable bed section is worked automatically.

The type of double bed to which this invention basically relates may have a movable bed section wherein the carrier member is a mere pusher, in which case the movable bed section is pushed thereby out to double bed position, or whether it is pushed out or pulled out, the movable bed section may have means for detachably securing it to such member. That is to say, if the movable bed section or frame is to be pushed out, it does not have to be connected with the carrier, but if the carrier is pulled out, a detachable connection is preferred.

In order to move the carrier bar rectilinearly, whether or not the movable bed section is merely pushed out or it is pulled out by the movable bed section, said carrier or coupling member is preferably connected with that section of the bed which is to remain stationary, by means of an equalizer preferably in the form of lazy tongs forming parallel motion linkage which tends to keep the two bed sections or frames substantially parallel with each other when the bed is in single bed position or double bed position, or is being moved from either of said positions to the other position.

If the movable bed section is either pushed out or pulled out, it is preferably connected with the carrier or coupling member in such way that when it has been moved to double bed position it may be detached from the carrier or coupling member and then moved away from double bed position so as to convert the two bed sections or frames into isolated or twin beds which may be spaced apart as desired, but in either event it is not absolutely essential that a detachable connection between the movable bed section or frame and the carrier or coupling member be provided.

The preceding being among the objects of the present invention, the same consists of certain features of construction and combinations of parts to be hereinafter described and then claimed with reference to the accompanying drawings illustrating one embodiment of the invention and wherein Fig. 1 is a plan of a convertible bed according to the present invention, the two bed sections or frames being shown as in relatively extended double bed position, and each of the same may be provided with a wire fabric or the like as partially indicated in broken lines;

Fig. 2 is a sectional elevation on the line 2—2, Fig. 1;

Fig. 3 is a horizontal sectional elevation of the bed section or frame and concomitant parts carried thereby and including the equalizer, the latter being shown in expanded position, as in Fig. 1;

Fig. 4 is a sectional elevation on the line 4—4, Fig. 3;

Fig. 5 is an end elevation of the bed sections in the double bed position shown in Fig. 1, the equalizer being omitted for the sake of clearness;

Fig. 6 is a horizontal sectional view of the bed section shown in Fig. 3, but wherein the other bed section is shown as telescoped or nested within the former frame, so as to provide a single bed;

Fig. 7 shows a modified detail, and

Figs. 8, 9 and 10 inclusive illustrate a modified construction of power mechanism.

Referring to the drawings, there are two frames or bed sections 10, 11, respectively, these being so constructed and proportioned that they may telescope one within the other, so as to provide a single bed, or a double bed when the two bed frames are moved relatively to an outward position.

Bed frame 10 is preferably constructed as follows: Angle metal bars 12, 13, 14 and 15 are provided so as to be connected together in oblong shape, the bars 12, 13 extending longitudinally and the bars 14, 15 being at the ends. Other end bars 16, 17 are provided, the bars 17 being also preferably of angle metal. Legs 18 preferably without casters are arranged at the four corners of the oblong frame and these are preferably made of angle metal.

The positions of the longitudinal or side bars are preferably reversed with respect to each other, that is to say the vertical flange of the side bar 12 extends downwardly while the vertical flange of the other rail 13 extends upwardly and supports a longitudinal finishing rail 19. These parts are all assembled together as by riveting so as to provide permanent connections and a rigid frame. Covering boards or the like 20 are secured to the ends of the frame 10 while the covering board 21 is secured to the bar 12 and the legs 18.

The other frame or bed section 11 comprises longitudinal angle metal bars 22, 23, transverse angle metal bars 24, 25 and legs 26, these parts being rigidly assembled together as by riveting. Thereby an oblong frame is provided which is of less proportions than the frame 10, to permit it to be telescoped into the frame 10. Inasmuch as in the example shown, the frame 11 is the movable one, preferably the legs 26 thereof are provided with rollers or casters 27 so that it may be moved back and forth on the floor without injury thereto and with a greater freedom of movement. As is shown, therefore, each of the bed sections or frames provides a single unit which may be supported as such independently from the floor.

Referring more particularly to Figs. 2, 3 and 4, the bed section or frame 11 is specifically illustrated and described as the relatively movable one, although it is obvious that the other frame 10 may be the one which is relatively movable. The frame 10 is provided upon its back 21 with a longitudinally extending and rigidly fixed rail 28. This rail may be of angle metal with the vertical flange extending upwardly away from the inwardly extending horizontal flange. Connected with this rail 28 is an equalizer preferably in the form of lazy tongs providing parallel motion linkage including two bars or links 29, 30 which are pivoted together at their midlengths by means of a pivot 31. Each bar 29, 30 is preferably a little shorter than the length of the rail 28, because it is preferred that such an equalizer be connected with the rail 28.

The bar 29 is provided with a pivot pin 32 for pivotally connecting it at one end with one end of the rail 28. The bar 30 is provided at one end with a pin or stud 33 which is guided in a slot 34 of the rail 28, such slot extending longitudinally of the bed section or frame 10. It will be seen that the pivot 32 forms a fixed pivotal point, while the pin 33 may be moved longitudinally towards or from the pin 32.

A rail 35 is mounted upon the equalizer 29, 30, and this rail may also be of angle metal. On a line transversely of the bed frame 10 at a point opposite the pivot 32, the bar 30 is connected by a pivot 36 with the adjacent end of the rail 35. The outer end of the bar 29 is provided with a pin or stud 37 which passes through a slot 38 extending longitudinally of the adjacent end of the rail 35.

It will be seen herefrom that the equalizer 29, 30 is preferably so constructed and arranged, and so connected with the rails 28 and 35 that these rails are maintained in substantial parallelism, in any position of the expansible and contractible equalizer. In consequence the equalizer causes the rail 35 to move rectilinearly in either direction with respect to the bed frame 10 upon which it is mounted. Also in this specifically described and illustrated construction of equalizer, the pivot pin 31 is caused to move rectilinearly with respect to the rail 28, and the pins 33 and 37 are caused to move in a direction longitudinally of the bed frame 10, the said specific equalizer therefore comprehending parallel motion linkage. When the equalizer is in expanded position, the pins 33, 37 will come to a stop at the closed inner ends of the slots 34, 38, thereby limiting the outward movement of the equalizer and hence of the rail 38.

Preferably the proportions of the equalizer are such that when it is fully extended in an outward direction, the rail 35 will be positioned outwardly away from the bed frame 10 in a spaced relation therewith, as shown in Figs. 3 and 5.

An important feature of the present invention resides in a member which here takes the form of a rail, and such member 35 will herein be referred to as a carrier member or coupling member, as in some cases it may merely carry the frame 11 outwardly or in other cases it may be positively connected with said frame, in which case it constitutes a coupling member, although at the same time a carrier member. The length of the carrier or coupling member 35 is preferably a little less than the length of the complete bed structure, so that it will act throughout the length of the bed in acting to maintain the bed frame 11 parallel with the bed frame 10.

The carrier or coupling member 35, when in the form of a long rail, is preferably provided at each end with a downwardly extending leg 39 which is terminated by a roller or caster 40, so that the member 35 is supported directly from the floor and may ride thereon freely.

It will therefore be seen that in the preferred embodiment of the invention the carrier 35 and concomitant parts are in the form of a carriage which may travel on the floor, and that its transverse dimensions are very slight relatively to the width of the bed frame 10. In consequence the specific carriage will take up very little space when projected out from the bed frame 10, and likewise when it is disposed back into the bed frame 10 adjacent the rail 28.

In the preferred construction the bed frame 11 is provided with downwardly extending fixed pins 41 which are located upon the fixed longitudinal bar 22, and the rail 35 is provided at opposite ends with holes or sockets 42. As the rail 35 is preferably located in a plane below that of the top frame of the bed section 11, the pins 41 may be entered downwardly into the holes 42 of rail 35, as shown clearly in Figs. 2 and 5. Therefore, when the rail 35 constitutes a coupling member, the pins 41 constitute coupling pins for detachably connecting the bed frame 11 with the member 35.

As specifically illustrated and described, the bed frame 11 is positively yet detachably connected with the equalizer through the medium of the carrier member or rail 35, and when the bed frame 11 is moved outwardly it will cause a like movement of the member or rail 35, with the result that the equalizer 29, 30 is expanded, and the bed frame 11 compelled to partake of a movement in a rectilinear direction with respect to the bed frame 10.

When the bed sections or frames are in the relative outwardly disposed position, shown in Fig. 5, a double bed is provided, and each bed section may be each separately made up with mattresses and corresponding bed clothing.

When the bed frame 11 is moved to the position shown in Figs. 1 and 5, it is clear that as shown in broken lines in Fig. 5, the bed frame 11 may be tilted from one edge upwardly so as to disengage the pins 41 from the carrier or coupling member 35. Then the bed frame 11 may be moved the desired distance along the floor so as to bring it into extra spaced relation with respect to the bed frame 10. When it is desired to again telescope or nest the bed frame 11 within the bed frame 10, the pins 41 of the former are re-engaged with the carrier or coupling member 35. Thus it is apparent that the bed of the present invention is convertible into a double bed or into more greatly spaced apart bed frames or sections in a twin bed position, and from either one of these positions the bed is convertible into a single bed, so as to form a couch or sofa.

It will be seen that this invention preferably comprises a carriage separate from the rolling bed section with separate brackets 39 and rollers 40 on the carriage. The bars 28 and 35 are of flat stock, as are also the links 29 and 30, the adjacent faces thereof being in horizontal planes. With such construction the flat stock and the ensuing frictional engagement, with the faces of the stock in a horizontal plane, keep the single roller brackets in proper vertical position.

Although the present invention takes the form of a convertible bed which may be adjusted to double bed position by pulling out the bed frame 11 from the bed frame 10, or vice versa, preferably means are provided whereby when desired the carrier member 35 may be pushed out from the bed frame 10, instead of being pulled out by the bed frame 11. To this end a tension spring 43 is preferably employed. This is clearly seen in Figs. 2 and 4. The spring 43 is preferably formed with helical coils and it is disposed longitudinally underneath the horizontal flange of the stationary rail 28. With opposite ends of tension spring 43 short links 44, 45 are connected, and the outer ends thereof are pivotally connected respectively with the rail 28 directly and with the pivot or stud 33 of the equalizer. It will be seen that when the bed sections or frames are moved into single bed position, the tension spring 43 is extended to its normal limit of extent, because the connecting link 30 of the equalizer has been moved into the position shown in Fig. 6, where it is almost parallel with the rail 28. In such position the link 30 acts to restrain the tendency of the spring 43 to push the movable bed section or frame outwardly inasmuch as the spring is pulling on a line almost parallel with the connecting link or bar 30 of the equalizer. This is because the movable bed section moves at substantially right angles to the thus positioned link 30 and the tension spring, so that the spring will not be able to push out the movable section until that section has been pushed or pulled out slightly away from the line of tension of the spring.

In consequence of the preferred restraining tendency of the link 30 on the helical tension spring 43, means are provided for overcoming that tendency and freeing the equalizer from such action. To this end preliminary impulse means are provided for starting the outward movement of the bed frame 11. Such means preferably comprise a foot operable crank lever 46 shown in Figs. 3 to 6 inclusive, such lever being mounted upon and formed integral with a pivot 47 which extends through one end of the bed frame or section 10 and is mounted in a bearing of a bracket 48 which is fixed to an end bar 17 of the bed frame 10. The pivot 47 is provided with an integral push arm 49 which extends at right angles thereto and is provided at its free end with an upwardly deflected toe portion 50. It is obvious that when the crank lever 46 is depressed manually, that the toe 50 operated thereby acts to push outwardly against the adjacent frame bar 22 of the movable bed section or frame 11, as indicated in broken lines in Fig. 5. Thereby a positive impulse is given to the movable bed frame 11, thereby slightly expanding the equalizer 29, 30, so that the tension spring 43 can no longer exert its tension along the line which is substantially parallel with the line of the bar 30, and the tension of the spring then acts upon the adjacent end of said bar, thereby acting to move the equalizer to its fully expanded position, shown in Fig. 3, and to automatically move the bed frame 11 to double bed position. The limit of the expansion of the equalizer is reached when the spring 43 pulls the pin 33 against the closed inner end of the slot 34. When the bed frame 11 is moved back into single bed position, the equalizer is contracted and the spring 43 placed under tension until the equalizer bar 30 and the bed frame 11 act to restrain the movable bed section against a relative outward movement. This is because of the fact that at such time the bar 30 and the spring 43 will be substantially parallel as before stated. Hence the spring does not exert its force on the frame 11 to push it out until such frame has been moved slightly away from the line of pull of the spring. Thereupon the equalizer will be expanded by the spring and push out such frame 11.

It is obvious herefrom that when automatic means are employed for opening up the bed, that the carrier member 35 need not act as a coupling member for the movable bed frame 11, as it can simply act as a pusher or carrier, inasmuch as no positive detachable coupling means is necessary when the movable bed frame is to be pushed back to double bed position.

Preferably the means for overcoming the restraining tendency of the tension spring against the automatic action includes means for returning the crank lever 46 immediately to normal position when it is released. Such means comprise an inward lateral projection 51 on the crank lever 46, and with which there is connected one end of a tension spring 52 which at its opposite end is fixed to a part of the bed frame 10.

Briefly summing up the operation of the preferred form of the invention, it will be seen that when the relatively movable frame is pushed out from the other bed frame, that the telescoping bed frames are relatively extended to double bed position by reason of the connecting bars 29, 30 between the two frames, and that when the movable frame is manually pulled out, the bars act as guides. As these bars are preferably in the form of an equalizer, the relative positions of the two bed frames are at all times parallel so that when the moved out section has been moved to double bed position it may be disconnected from the connecting bars and moved to twin bed position.

Also it will be seen that when power means such as tension spring 43 are utilized and the frame which is to be automatically moved out thereby to double bed position is released from the power means in such way as to free it for movement, it may be moved out automatically to double bed position, and that in this case it is unnecessary that coupling means be used between the movable frame and the automatically moved out carrier, inasmuch as the moving out is accomplished by a mere push, and when the moved out frame is to be telescoped within the other frame it can operate on the connecting means to the carrier without requiring any detachable connection between the two frames. When the two frames are in fully telescoped inward position, power preferably is stored up by reason of distending the tension spring in such way as to render its power useless, until it is released for action. Of course it is obvious that with modification either of the bed frames or sections may constitute the movable section, in which case the rail 35 or the equivalent would be fixed to the bed frame 11 while the rail 28 would be detached from the bed frame 10 and act as a carrier to push it out, but the mechanism would be contained within the bed frame 10 as it is in the preferred construction.

In any case it is preferred that when detachable coupling means are utilized that the bed frames be so moved outwardly relatively to each other that they will be clear of each other when it is desired to disconnect the one from the other. It will furthermore be seen that when lazy tongs providing an equalizer are employed to connect one of the frames with the carrier, that the same may not only be contracted and expanded transversely of the frame, but that the pin-and-slot connections provide slide means for also guiding the lazy tongs longitudinally of the bed frame on which they are mounted.

If desired, the telescoping bed frames may be made of a height so as to be more greatly spaced apart vertically than in the construction shown and described, with a view to placing on the lower frame an elevating mattress section which may be raised to the level of the mattress section of the outer frame when such lower frame is out in double bed position.

Referring to Fig. 7 a slight modification of the preliminary impulse means is shown. In this case a cam or hump 53 is provided on the arm of the impulse means. When the impulse means is in normal position, as shown in Fig. 7, the said cam will act to slightly raise the rail 35 when that is being pushed back to the closed position of the bed, and when the rail is fully pushed back it will drop for a slight distance behind the cam, thereby a positive lock is provided against accidental pushing out of the movable bed frame. When the arm of the impulse means is raised it will act to release the rail 35 before said arm strikes the bar 22 of the movable bed frame.

It is obvious that this invention is susceptible to more or less modification which may be resorted to by skilled mechanics without departing from the spirit of the invention as defined in the appended claims. For a further example of a desirable modification in addition to the one heretofore described, a construction may be used as follows:

Referring to Figs. 8, 9 and 10, a foot pedal 54 projects for convenient access from the outer end of an elbow lever 55 mounted upon a pivot 56 which is carried by a plate 57 which depends from the lower portion of the stationary frame 58. To the long arm of the elbow lever 55 there is secured one end of a helical spring 59 which at its opposite end is secured to the frame 58. The tendency of this spring is to throw the lever 55 into upward position after each depression thereof as indicated in broken lines in Fig. 8.

A link 60 is pivoted at one end by a pivot 61 to the upper end of the short arm of the lever 55 and at its other end by a pivot 62 to a push arm 63 at a point a slight distance above a pivot 64 at the lower end of the push arm 63, which pivot 64 is carried by the plate 57 already referred to. The push arm 63 is suitably bent so that it may be swung through an arc of suitable length without interference by the frame 58. The upper end of the arm 63 is provided with a laterally deflected toe 65 which with the arm 63 is adapted to be moved from the position shown in full lines in Fig. 8 to the position shown in broken lines.

It will be readily seen that by reason of the proportions and the pivot locations of the parts of the power means which has just been described, a downward movement of the foot pedal 54 for the purpose of operating the power means is of less range than the range of inward movement of the toe 65 of the presser arm 63, and also that the power means may be readily operated, it being returned to full line position by the action of the helical spring 59.

The toe 65 of the pressure arm is located in the horizontal plane of the frame 66 of the outwardly movable bed section, so as to act on the latter when the foot pedal is depressed. As in the preferred form of the invention previously described, the movable frame 66 is provided with depending stationary pins 67 (only one of them at one end of the frame being shown), and such pins are adapted to be entered into holes in the rail or carrier member 68, whereby the latter may be coupled with the outwardly movable bed section 66 or the latter may be detached from the carrier member 68, as previously described. Carrier member or rail 68 is mounted on a frame 69 provided with supporting legs 70. The outwardly movable frame or section 66 is provided with supporting legs 71. The main frame 58 is provided with supporting legs 72.

It is obvious that in the modified construction of Figures 8, 9 and 10, the links 73, 74 of the equalizer such as previously described need not have associated with them a tension spring such as 43 heretofore described, but that such spring may be entirely omitted. In other words, the back rail 75 does not support such a tension spring as in the previously described construction. Such tension spring may be here omitted for the reason that the foot operated power means is more powerful than the other mechanism, inasmuch as a suitable depression of the foot pedal 54 will cause the toe 65 of the pressure arm 63 to press upon the movable frame or bed section with such force as to push out the latter to its extended position for double bed formation. This is particularly the case where a hard floor is afforded for the casters to roll upon or even where a carpeted surface is provided, as these will offer no objectional resistance to the full opening movement.

What I claim as new is,—

1. In a bed structure, the combination of a main bed frame, an equalizer including a pair of bars pivoted together to provide a set of lazy tongs, and a carrier member longitudinal of the bed frame, and having a support independently of the frame, corresponding ends of the bars pivoted to a side portion of the frame and to the carrier member, and the opposite ends slidably connected therewith, such member constituting a coupling member adapted for detachable connection with and operation with another bed frame.

2. In a bed structure, the combination of a main bed frame, an equalizer including a pair of bars pivoted together to provide a set of lazy tongs, and a carrier member longitudinal of the bed frame, and projectible therefrom corresponding ends of the bars pivoted to a longitudinal side portion of the frame and to the carrier member, and the opposite ends slidably connected therewith, such member constituting a coupling member adapted for detachable connection with and operation with another bed frame, and a tension spring secured at one end to such side portion of the first frame and at its opposite end to the slidable end of one of the bars, such spring being distended when the bars are in collapsed position, and means for acting on such carrier member to give it an initial impulse.

3. In a bed structure, the combination of a main bed frame, an equalizer including a pair of bars pivoted together to provide a set of lazy tongs, and a carrier member longitudinal of the bed frame, corresponding ends of the bars pivoted to a side portion of the frame and to the carrier member, and the opposite ends slidably connected therewith, such member adapted for operation with another bed frame, and a tension spring secured at one end to the first frame and at its opposite end to the slidable end of one of the bars, such spring being distended when the bars are in collapsed position, and manually operable means for giving an outward impulse to the equalizer from its collapsed position, whereby to permit the spring to act to automatically expand the equalizer.

4. In a bed structure, the combination of two telescoping bed frames, a carrier member associated with one of the frames for horizontally acting on one of the frames, and means including a tension spring and an equalizer for automatically acting on the carrier member to cause it to thus act and to move the frame acted on to a position outwardly to provide a double bed the tension spring being fixed at one end on the rear portion of the other frame, and one end of the equalizer having a movement longitudinally of such associated frame and being connected with the opposite end of the spring on a line with the direction of such longitudinal movement.

5. In a bed structure, the combination of two telescoping bed frames, one frame adapted to remain in situ, and power mechanism mounted on such frame including a pivoted foot lever, a pivoted push lever, and means connecting the two levers for substantially increasing the throw of the push lever over that of the foot lever, such push lever being operable on the movable frame to push it by one impulse to double bed position.

6. In a combination article of furniture which includes a pair of nestable fixed and movable bed frames, means carried by and located within the larger frame for shifting one of the frames to an unnested relation to the other, said means consisting of an elastic element comprising a bar extending in a direction perpendicular to the direction of movement of the movable frame, a plurality of arms having connection with each other and with the fixed frame and bar respectively and spring means for swinging the arms to shift the movable frame to an unnested position by abutment of the bar with the movable frame.

7. A main bed section having a rear wall and two side walls to form a chamber and a flange having a face disposed in a horizontally extending plane along the inner face of said rear wall, a carriage having a longitudinally extending bar, a downwardly extending bracket adjacent each end of said bar, a single roller journaled at the lower end of each of said brackets, said bar having a face disposed in a horizontally extending plane, links composed of flat stock having faces that extend in horizontally extending planes, said links being pivotally connected to frictionally engage the flat faces of said flange and bar to produce a bracing connection which will maintain said carriage in upright position during movement into and out of said chamber, and an auxiliary bed section connected to said carriage.

8. A main bed section having a chamber, a carriage, an ejector operatively connecting said carriage to said main bed section to eject said carriage out of said chamber, an abutment on said carriage, a rock shaft on said main bed section, a catch fixed to said rock shaft, a lever fixed to said rock shaft, a pedal operatively connected to said lever and extending from under the lower edge of one side of said main bed section, a spring for normally maintaining said catch in position to engage said carriage abutment and anchor said carriage against ejection but yieldable in response to the actuation of said lever to release said carriage abutment and thereupon liberate said ejector to eject said carriage, and an auxiliary bed section adapted to be connected to said carriage.

9. In a bed structure the combination of two telescoping bed frames adapted for relative movement from single bed position to double bed position, a carrier member, means for supporting the carrier member for horizontal movement from one side to the other of one of said frames, an expansible equalizer connecting said carrier with said one frame to maintain the carrier parallel to the length of said one frame, resilient means operatively connected with the equalizer for expanding it and thereby moving the carrier, and means connecting the second frame with the carrier whereby the carrier may move the second frame from telescoped position to double bed position, said means comprising engaging parts separable by relative vertical movement whereby the second frame may be entirely separated from the carrier and used as an independent bed.

10. A main bed section having a rear wall and two side walls to form a chamber, and a flange having a face disposed in a horizontally extending plane along the inner face of said rear wall, a carriage which as such is free from supports which would maintain it in upright position when moving, and the carriage having a longitudinally extending bar, a downwardly extending bracket adjacent each end of said bar, a single roller journaled at the lower end of each of said brackets, said bar having a face disposed in a horizontally extending plane, links composed of flat stock having faces that extend in horizontally extending planes, said links being pivotally connected to frictionally engage the flat faces of said flange and bar to produce a bracing connection which will maintain said carriage in upright position during movement into and out of said chamber, and an auxiliary bed section connected to said carriage.

11. A main bed section having a rear wall and two side walls to form a chamber, and a flange having a face disposed in a horizontally extending plane along the inner face of said rear wall, a carriage having a longitudinally extending bar, a downwardly extending bracket adjacent each end of said bar, a single roller journaled at the lower end of each of said brackets, said bar having a face disposed in a horizontally extending plane, and the bar, brackets and rollers providing a carriage which, alone, tends to fall over, links composed of flat stock having faces that extend in horizontally extending planes, said links being pivotally connected to frictionally engage the flat faces of said flange and bar to produce a bracing connection which will maintain said carriage in upright position during movement into and out of said chamber, and an auxiliary bed section connected to said carriage.

12. In a bed structure, the combination of two telescoping bed frames, a carrier member separate from the frames, means detachably connecting the carrier member with one of the frames for horizontally acting on that frame, and means mounted on the other frame and connected with the carrier member for automatically acting on the carrier member to cause it to thus act and to move the frame acted on to a position outwardly and clear of the other frame to provide a double bed, in which position the frame acted upon is separable from the carrier member at will.

13. In a bed structure, the combination of two telescoping bed frames, a carrier member associated with one of the frames for horizontally acting on one of the frames, and means including a tension spring and an extensible and collapsible equalizer for automatically acting on the carrier member to cause it to thus act and to move the frame acted on to a position outwardly to provide a double bed, the equalizer when collapsed acting to hold the spring distended, and means independent of the equalizer to positively act on the equalizer and free the spring so as to permit it to contract and act on the equalizer and carrier member.

JOSEPH BASILE.